United States Patent [19]
Lemelson

[11] 3,817,671
[45] June 18, 1974

[54] APPARATUS FOR FORMING SHEET MATERIAL

[76] Inventor: Jerome H. Lemelson, 85 Rector St., Metuchen, N.J. 08840

[22] Filed: Aug. 2, 1972

[21] Appl. No.: 277,403

Related U.S. Application Data

[63] Continuation-in-part of Ser. No. 68,724, Sept. 1, 1970, Pat. No. 3,708,253, and a continuation-in-part of Ser. No. 736,081, June 11, 1968, Pat. No. 3,526,020.

[52] U.S. Cl. ................... 425/66, 425/290, 425/327, 425/382 N, 425/445
[51] Int. Cl. ............................................ B29c 17/02
[58] Field of Search ............. 425/66, 290, 325, 327, 425/328, 382 N, 445, 446

[56] References Cited
UNITED STATES PATENTS

| | | | |
|---|---|---|---|
| 3,214,502 | 10/1965 | Schaar | 425/290 X |
| 3,318,267 | 5/1967 | Artiaga et al. | 425/290 X |
| 3,594,870 | 7/1971 | Schippers | 425/66 |
| 3,664,780 | 5/1972 | Fairbanks et al. | 425/66 |

*Primary Examiner*—Robert L. Spicer, Jr.

[57] ABSTRACT

An apparatus and method are provided for forming sheet material having openings therein extending for substantially the entire length of the sheet. In one form, the sheet is formed of plastic and, while in a heat softened condition, openings are provided therein by the insertion of tooling into the sheet at spaced apart intervals which tooling displaces material of the sheet to form cavities or holes therein. In a particular form, the sheet is predeterminately expanded to form enlarged openings either while the tooling is retained within the sheet or thereafter while the sheet is in an expandable condition. The sheet may be post formed by suitable dies or rollers after it has been expanded to control or predetermine its shape.

8 Claims, 5 Drawing Figures

PATENTED JUN 18 1974　　3,817,671

APPARATUS FOR FORMING SHEET MATERIAL

RELATED APPLICATIONS

This is a continuation-in-part of application Ser. No. 68,724 filed Sept. 1, 1970, now U.S. Pat. No. 3,708,253, for Extrusion Apparatus and Techniques, having as a parent application Ser. No. 736,081 filed June 11, 1968, now U.S. Pat No. 3,526,020, and in turn in which this application is also a continuation-in-part thereof.

SUMMARY OF THE INVENTION

This invention relates to an apparatus and method for forming sheet material, such as sheet made of a synthetic polymer which is extruded or calendered to shape. In particular, the invention relates to an apparatus and method for forming sheet material with a plurality of openings therein so as to define a lattice or net-like sheet having many uses.

It is known in the art to die-cut slit like openings in a sheet of metal and to expand the sheet thereafter, while it is in an as-rolled condition, by tensionally drawing the sheet and cold expanding same. Metals such as steel and aluminum are sufficiently ductile that they may be so expanded while cold without appreciably weakening the sheet or developing cracks and stretches within the sheet. Plastic material such as thermoplastic polymers may not be easily expanded in the manner described above due to the generally low ductility of most plastics and their plastic memory.

Accordingly it is a primary object of this invention to provide an new and improved apparatus and method for forming sheet materials made of synthetic polymers and other compositions with openings therein without the removal of material from the sheet.

Another object is to provide an apparatus and method for forming openings in a plastic sheet on a continuous basis as the sheet is fed through a sheet forming means.

Another object is to provide an apparatus and method for controllably expanding a sheet of plastic to provide openings therein.

Another object is to provide an apparatus and method for forming a sheet with openings therein wherein the forming means undesireably deforms the sheet, which apparatus includes means for post forming the sheet to control the shape.

Another object is to provide an apparatus and method for forming plastic sheet material with openings or cavities therein wherein the initial forming operation results in imparting undesirable characteristics to the sheet such as the generation of sharp edging and overstressed local portions of the sheet, the apparatus being operable to post form the sheet to alleviate most if not all of the undesirable characteristics.

Another object is to provide an apparatus and method for forming plastic sheeting with openings therein without generating scrap plastic.

With the above and such other objects in view as may hereinafter more fully appear, the invention consists of the novel constructions, combinations and arrangements of parts as will be more fully described and illustrated in the accompanying drawings, but that it is to be understood that changes, variations and modifications may be resorted to which fall within the scope of the invention as claimed.

Figure 1:
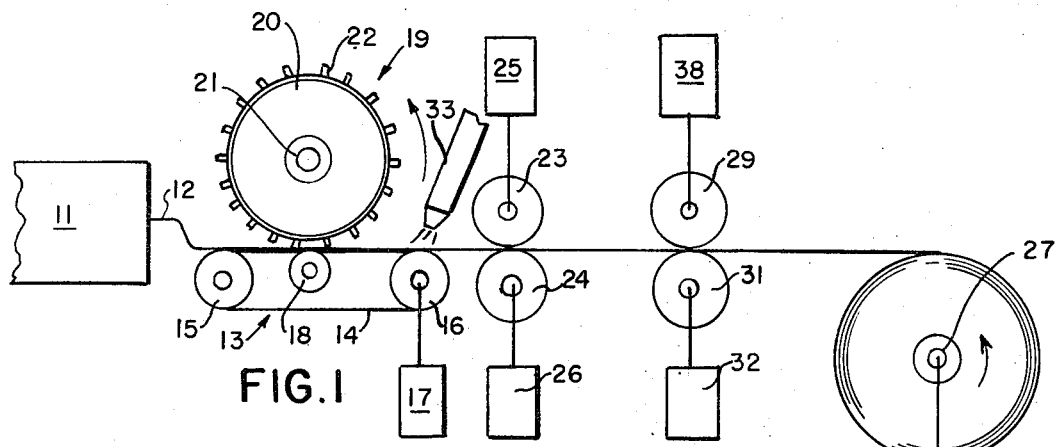
FIG. 1 is a schematic side view of an apparatus for forming a sheet and thereafter providing openings or cavities within the sheet as it is fed.

FIG. 1 illustrates an apparatus 10 for forming sheet material 12 wherein the sheet has interstices therein of predetermined characteristic shape. The sheet 12 may be formed of any suitable thermoplastic or thermosetting resin by means of an extruder 11 which feeds the sheet onto the upper surface of the belt 14 of an endless belt conveyor comprised of at least two pulleys or rollers 15 and 16, the latter 16 being driven by a constant speed motor 17 which is synchronized in its operation to drive the belt 14 at substantially the rate of extrusion. Any suitable plastic material which may be so formed and fed in a deformable condition to the conveyor 13 may be employed and such materials as polyethylene, polypropylene, polyvinylchloride, polystyrene, polycarbonate, as well as certain thermosetting resins and ceramic materials may be fed to the forming means illustrated in FIG. 1.

Figure 2:
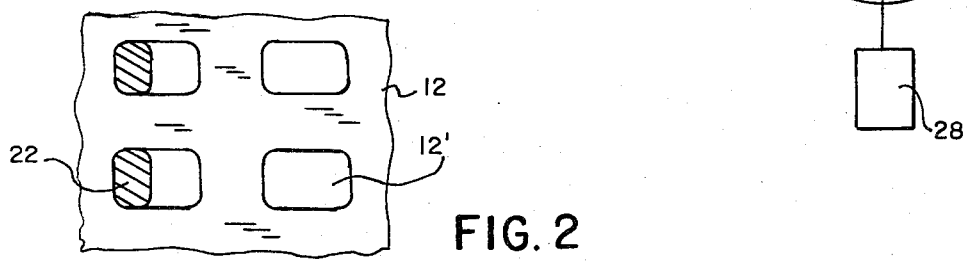
FIG. 2 is a plan view of a fragment of the sheet of FIG. 1 as it is being formed.

A typical sheet structure which is producible by an apparatus of the type shown in FIG. 1, is shown in FIG. 2 as containing interstices 12' of substantially rectangular shape.

Figure 3:
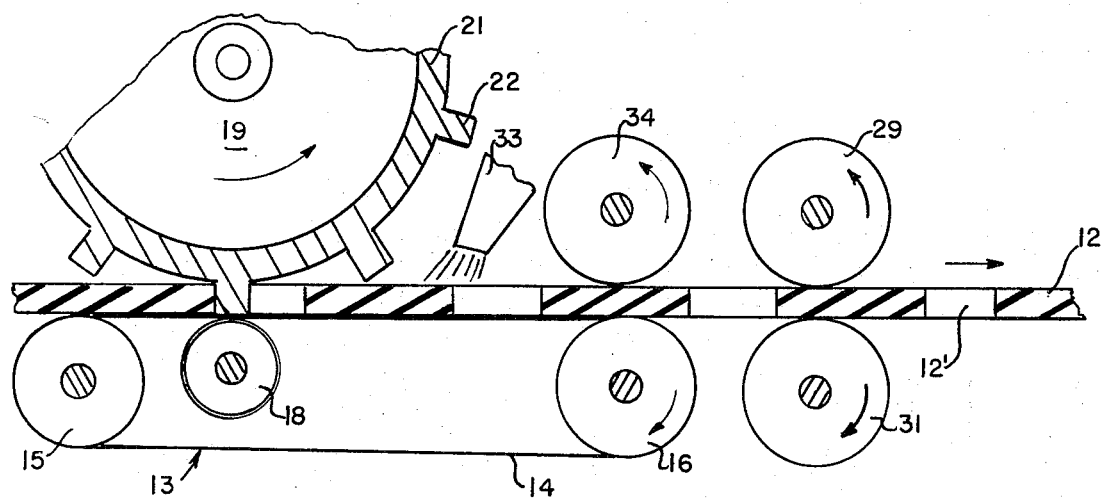
FIG. 3 is a partial side cross sectional view of a portion of the apparatus of FIG. 1.

The apparatus 10 of FIG. 1 includes an extruder 11 having a suitable means for forming the sheet 12 as it is fed by the extruder onto the endless belt conveyor 13. The sheet may also be calendered to shape or supplied from a roll. A bucking roller 18 is shown rotationally supported beneath the belt 14 to serve as a support for the sheet 12 and the upper portion of belt 14 as the fingers 22 of a forming drum 20 penetrate the sheet. The drum 20 is rotationally supported above the conveyor 13 on an axle 21 and is preferably driven by a constant speed motor (not shown) at a speed which is synchronized to the rate of extrusion and the speed of the belt 14 so as to provide spaced openings in the sheet by displacing material thereof while it is still in a heat softened or otherwise displaceable condition. In other words, if an extruder 11 is used to form the sheet 12, it may either be immediately fed to the conveyor 13 in such a condition that the fingers 22 of drum 20 may easily penetrate and display sheet material to form openings 12' therein or said sheet may be heated to a soft and easily displaceable condition after it is formed to shape to provide it in an easily deformable state when it travels between drum 20 and belt 14 immediately above the supporting roller 18. The teeth 22 of drum 20 may extend partly or completely across the width of sheet 12 and are shaped and spaced to provide openings of the desired spacing and shape within the sheet. If it is desired to reheat or control the plastic condition of the sheet 12 as it is operated on by the teeth of the drum 20, the drum itself may be heated by electrical or flame heating means disposed within the drum. Conversely, a cool heat-transfer fluid or refrigerant may be circulated through the interior of the drum 20 or jets of air may be ejected from the wall 20' of the drum to cool the sheet 12 immediately as and after it is formed to shape. However, notation 33 refers to a conduit disposed downstream of drum 20 for ejecting one or more streams of air or other fluid against the upper surface of sheet 12 so as to rapidly cool and set the material thereof. Located downstream of conduit 33 are a pair of rollers 23 and 24 which are respectively driven by controlled motors 25 and 26. The rollers 23 and 24 may engage the entire upper and lower surface of the sheet 12 or selected portions thereof and serve to tensionally draw the sheet in driving it towards a supply takeup roll 27 which is also shown as being driven by a controlled motor 28. The rollers 23 and 24 may also serve to perform one or more auxiliary operations on sheet 12 including drawing said sheet away from drum 20 while a row of fingers 22 of the drum are engaged within the sheet, as shown in FIG. 3, so as to expand the sheet and form openings therein which are larger than the openings formed by the fingers. Furthermore, the rollers 23 and 24 may also serve to roll form the sheet to predetermine its thickness.

Also illustrated in FIG. 1 are a second pair of rollers 29 and 31 which are respectively powered driven by motors 32 and 33. These latter rollers 29 and 31 may serve merely to drive the sheet onto the supply takeup roll 27 or to post form the sheet and either predetermine its shape and thickness or stress-relieve the previously formed portions of the sheet. Expansion of the sheet may also take place between the pairs of rollers by controlling operation of their respective motors to permit the sheet to be predeterminately tensionally drawn and permanently deform same so as to expand the openings therein. Accordingly suitable automatic control is provided for the motors 25 and 26 and, when utilized, the motors 32 and 38 to effect proper expansion and post forming of the sheet material, if required.

The following modes of operation of the apparatus 10 are noted and may be effected by suitably controlling the operation of the extruder or means feeding the sheet, the motor driving drum 20 and the various other motors illustrated in FIG. 1:

I. In a first mode of operation, the extruder 11 extrudes a sheet 12 of thermoplastic polymer or other suitable material at constant rate while the belt 14 and drum 20 are driven at constant speed. The rollers 23, 24 may or may not be employed to remove the sheet from the belt 14 and pull it towards take-up reel 27. Interstices of desired shape are formed in sheet 12 by displacement of sheet material by the fingers of protrusions 22 of the drum 20. The material of sheet 12 is in such a condition as it passes between drum 20 and belt 14 (e.g., heat softened) that it will be suitably displaced by protrusions 22 as they are forced through said sheet, yet will remain displaced after the protrusions 22 have been driven out of the sheet. Retention of the openings so formed in the sheet may be effected in one of a number of manners including (a) tensioning the sheet as it is cooled by the proper operation of motors 25 and 26, (b) rapidly cooling or otherwise setting the sheet as it is driven from drum 20 or providing the sheet as it is driven into alignment with drum 20 and conveyor belt 14 in such a plastic condition that it may be physically displaced with force but will not flow thereafter to close up the openings therein, or (d) flowing coolant through the drum fingers 22 to rapidly cool and set the molten material displaced thereby.

II. In a second mode of operation, the rollers 23 and 24 are power rotated in such a manner as to tensionally draw the sheet a degree so as to pull material thereof away from the drum 20 and those fingers 22 which are embedded in and through the sheet so as to expand the openings in the sheet formed thereby as shown in FIG. 3. The sheet 12 is in a set condition when it is penetrated by drum fingers 22 such that its expansion by the pulling action, serves to predeterminately deform it beyond the permanent openings 12' therein which remain or which shrink a predetermined degree to provide openings in the sheet. The sheet 12 may also be in a semi-molten or heat softened condition when it passes beneath drum 20 wherein it may be easily displaced by fingers 22 and maybe readily cooled to retain the expanded openings therein by flowing coolant thereagainst through one or more nozzles 33 disposed above and or below the sheet downstream of drum 20.

III. In a third mode of operation of the apparatus of FIG. 1, the drum 20 may be rotated intermittently and retain stopped while a group of fingers 22 thereof are disposed within the sheet and the rollers 23 and 24 are operated to expand or pull the sheet away from the drum to expand the openings 12' in the sheet and enlarge same as shown in FIG. 2. While so expanded, cool air may be ejected from the nozzles 33 against the sheet to lower its temperature and cause it to set with the expanded openings predeterminately retained therein. The rollers 22 and 23 may be power driven at constant speed in accordance with the extrusion rate and the speed of the conveyor belt 14 or may be speed controlled by signals generated by either the output shaft of the motor driving drum 20 or a transducer scanning the expanding sheet and detecting the degree which the openings 12' therein are expanding.

If the sheet 12 is fed from a calander forming same, it may be in a condition whereby it may be readily formed to shape or may require reheating by passing it over a heated drum or directing hot air thereagainst while the sheet is disposed against a conveyor belt such as 14.

IV. In a fourth mode of operation, the material fed between conveyor 13 and drum 20 may comprise an expanding plastic which has started to expand into a cellular plastic before reaching the vicinity of the forming drum. The drum 20 may serve either to form openings or cavities in the expanding sheet per se or to effect the combined operations of providing such openings and working the sheet material. Such working may be in the form of controlling the expansion of the sheet and/or providing a skin on the surface of the sheet including along the walls of the holes formed in the sheet by the fingers 22 of the drum. The expanded sheet may be fed per se along the conveyor 13 or an extension thereof without stretching as described or may be tensionally drawn and post formed as described above depending on the nature of the expanded plastic material.

V. In a fifth mode of operation of the apparatus described, a pre-expanded sheet of thermoplastic material such as cellular polystyrene, polyvinyl chloride or other suitable plastic may be fed to the conveyor 13 and drum 20. The wall 21 of drum 20 is heated permitting the fingers 22 to easily penetrate and thermally form holes in the sheet, as shown. Simultaneously the heated wall and fingers of the drum form a non-porous skin on the surface of the sheet and the walls of the holes formed therein. Heat applied to the sheet through belt 14 may be used to form a skin on the underside of the sheet providing a sheet structure as shown in FIG. 4.

Figure 4:
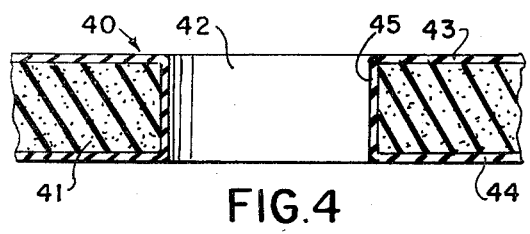
FIG. 4 is shown sheet material produced by the apparatus of FIG. 3.

The sheet material 40 shown in FIG. 4 may be produced by means of the apparatus of FIG. 3 with or without the powered rollers for tensionally drawings the sheet from the forming roll. The sheet 40 is made of a cellular plastic such as foamed polystyrene, polyethylene, polypropylene, polyurethane, synthetic rubber or other polymer forming the core portion 41 of the sheet. Interstices or holes 42 are provided through the sheet 40 at spaced locations as described above. Capping one surface of sheet 40 is a layer or skin 43 of non-porous plastic which may be formed of the same material forming the core portion 41 having the open cells thereof closed or collapsed by heat and pressure applied through roller 21. Capping the other surface of core 41 is a layer or skin 44 formed thereon by heat applied from below such as through conveyor belt 14 by flame or radiant electrical heating means applied to the under surface of belt 14. Formed by heat applied through the fingers 22 of the drum 20 is a skin 45 extending along the walls of the holes 42 in the sheet. The skin or layers 43, 44 and 45 of non-porous plastic serve a number of purposes including, in addition to substantially reinforcing and strengthening the sheet 42, reinforcing the weakened portions of the sheet which are immediately adjacent the openings and totally enclosing the cellular portion of the sheet.

Figure 5:
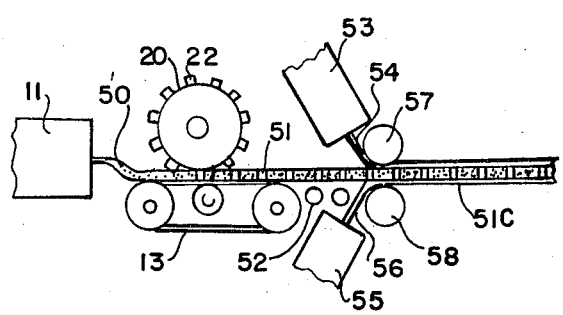
FIG. 5 is shown another form of the invention which employs extrusion coating of a core material.

In FIG. 5 is shown another form of the invention which employs, in addition to an apparatus of the type shown in FIG. 3, means for extrusion coating the formed sheet on both surfaces thereof with respective layers or sheets of the same or different plastic materials to provide a composite material having a core with openings therein forming cells which are closed by the capping layers. A sheet 50 of suitable material such as one of the described polymers extruded per se or provided with a blowing agent causing it to self expand and become cellular in nature as it exits from the extruder 11, is fed onto an endless powered conveyor 13 which cooperates with powered roller 20 is forming openings 51 in said sheet to provide either of the structures 12 or 40, which sheet structure is then fed along a conveyor 52 between rollers 57 and 58. Separate extruders 53 and 55 extrusion form and feed respective sheets 54 and 56 of plastic to the outer surfaces of expanded plastic sheet 50 prior to the location of the rollers 57 and 58 which are adjusted and operative to compress sheets 54 and 56 into engagement with the opposite surfaces of sheet 51 so as to fusion bond said capping sheets to the core sheet 50. The rolls 57 and 58 may be operable to compress the three sheets to provide a composite material 50C thereof of reduced thickness or of substantially the same thickness as the three sheets.

I claim:

1. An apparatus for forming sheet material with interstices therein comprising:

means for feeding a sheet of material, sheet forming means operable to receive said sheet as it is fed, said sheet forming means including a support having protrusions extending therefrom for forming openings in said sheet and means for driving said support to bring said protrusions into engagement with said sheet in a manner to penetrate and form openings in said sheet by displacing material of the sheet, means for rendering said sheet in a softened condition, and means operable to engage and apply a force to a portion of said sheet while said protrusions are penetrating said sheet and restrain the movement of said portion of said sheet so as to tension said sheet sufficiently to cause the sheet to be stretched and expanded whereby the openings formed by said protrusions are increased in size.

2. An apparatus in accordance with claim 1 wherein said sheet forming means comprises a drum having said protrusions extending radially therefrom and means for power rotating said drum in a manner to permit said sheet to be tensionally driven therefrom.

3. An apparatus in accordance with claim 1 including means for roll forming said sheet after it has left said sheet forming means.

4. An apparatus in accordance with claim 1 wherein said sheet forming means is a power rotated drum having protrusions extending outwardly therefrom, said means operable to engage and apply a force to a portion of said sheet comprising a roll forming means located downstream of said drum for compressing and forming said sheet to shape.

5. An apparatus in accordance with claim 4 wherein said means for tensioning said sheet and said roll forming means comprises at least one set of opposed power rotated rolls.

6. An apparatus in accordance with claim 1 including means for intermittently power operating said sheet forming means and controlling the operation of said means operable to engage and apply a force to a portion of said sheet while the protrusions of said sheet forming means are penetrating said sheet so as to intermittently stretch-form said sheet and predeterminately expand the openings formed therein by said protrusions of said support each time said protrusions are made to penetrate said sheet.

7. An apparatus in accordance with claim 1 wherein said means for feeding a sheet of material comprises an extruder for extruding said sheet of thermoplastic material in a softened and formable condition in which condition it is operated on by said forming means whereby said forming means may easily form and displace the material of said sheet with the protrusions thereof and means for rapidly transferring heat from said sheet to solidify same to retain said openings in said sheet in substantially their expanded condition defined by the tensioning and stretching of said sheet.

8. An apparatus in accordance with claim 1 in which said means for feeding said sheet comprises an extruder for extrusion forming said sheet of self-expanding plastic which forms a cellular sheet of the extruded plastic after leaving said extruder.

* * * * *